United States Patent [19]

Larson et al.

[11] 3,904,365

[45] Sept. 9, 1975

[54] METHOD AND APPARATUS FOR MEASURING THE PRESENCE OF A WEAK ACID OR A WEAK BASE IN A LIQUID

[75] Inventors: Thurston E. Larson; Russell W. Lane; Chester H. Neff, all of Champaign, Ill.

[73] Assignee: Department of Registration and Education of the State of Illinois, Champaign, Ill.

[22] Filed: Aug. 18, 1972

[21] Appl. No.: 281,778

[52] U.S. Cl. ............ 23/230 R; 23/253 R; 204/1 T; 324/30 R
[51] Int. Cl. ............ G01n 27/56; G01n 31/16; G01n 33/18
[58] Field of Search ..... 23/230 R, 253 R; 324/30 B, 324/30 R; 204/195 R, 195 T, 1 R, 1 T

[56] References Cited
UNITED STATES PATENTS

| | | | |
|---|---|---|---|
| 2,046,583 | 7/1936 | Rummel | 23/230 R |
| 2,559,090 | 7/1951 | Potter | 23/253 R UX |
| 2,832,673 | 4/1958 | Larson et al. | 23/253 R X |
| 3,466,228 | 9/1969 | Trebes | 23/230 R X |
| 3,531,252 | 9/1970 | Rivers et al. | 23/230 R |

OTHER PUBLICATIONS

E. C. Potter, Electrochemistry Principles & Applications, London, Cleaver Hume Press Ltd. 1956, pages 20–26, 64–68, 183–187, QD553 P64.

Primary Examiner—Robert M. Reese
Attorney, Agent, or Firm—Schuyler, Birch, Swindler, McKie & Beckett

[57] ABSTRACT

A method and apparatus for measuring the presence of a weak acid or weak base in a liquid by withdrawing a sample from the liquid; reacting the sample with an excess amount of strong acid or strong base reagent; measuring the conductivity of the reagent-treated sample and comparing the measured conductivity to a standard value.

30 Claims, 4 Drawing Figures

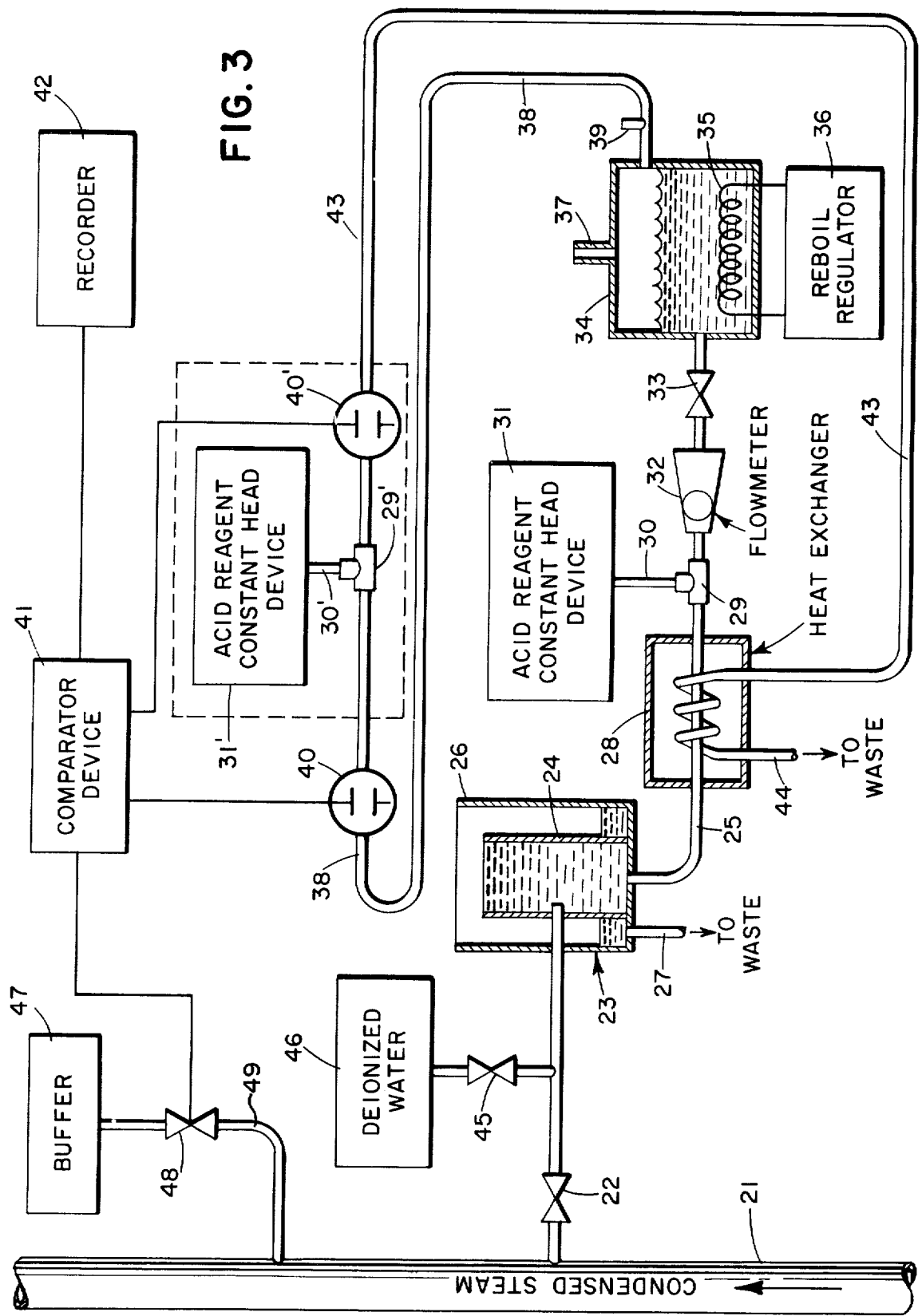

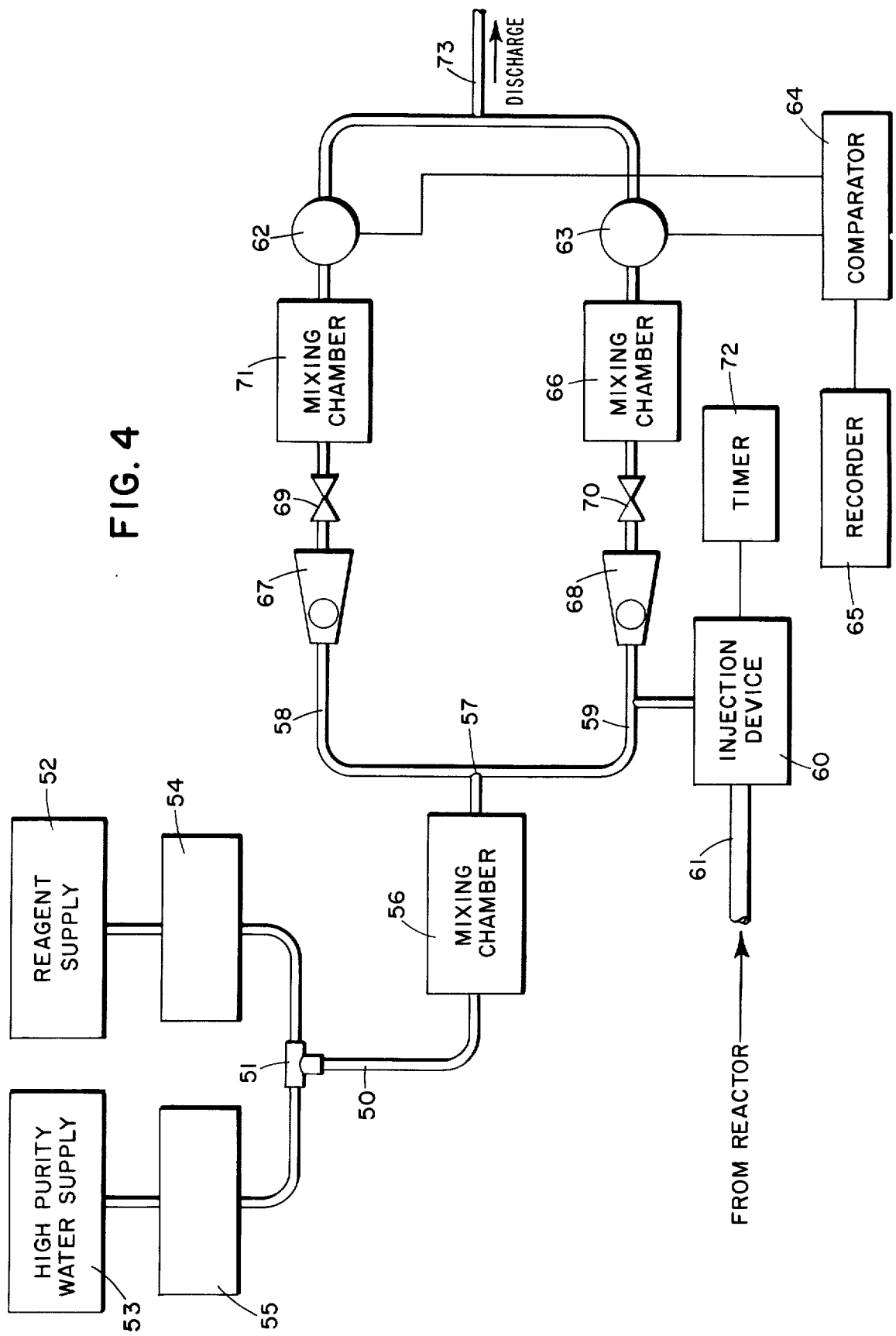

METHOD AND APPARATUS FOR MEASURING THE PRESENCE OF A WEAK ACID OR A WEAK BASE IN A LIQUID

The use of conductivity measurements to determine the composition of liquids is known, as exemplified by U.S. Pat. No. 2,832,673. More recently, methods have been proposed for analyzing the composition of solutions utilizing differential electrical conductivity. Such methods are exemplified by U.S. Pat. No. 3,531,252. However, no conductivity method has been available which would satisfactorily measure the presence of a weak acid or weak base in a liquid.

Generally, a substantial portion of a weak acid or weak base in solution is present in un-ionized form. Since the conductivity of a liquid is a function of the ions therein, conventional conductivity methods are unsuited for measuring the amount of un-ionized weak acid or base present in a liquid. Further, although conductivity measurements are generally highly sensitive, quantitative detection of minute quantities of ions resulting from the limited ionization of a weak acid or base in solution is still very difficult.

In many situations, control of the acidity or alkalinity of a liquid is extremely critical, such as in steam boilers or turbines where deviation from a preferred alkalinity has a corrosive effect on expensive equipment, so, a buffer is added to the liquid to resist changes in acidity or alkalinity. A buffer generally consists of two ingredients; a weak acid and a weak base although it is well known that a solution containing only a weak acid or only a weak base may act as buffered solution. When a strong acid is added to a buffered liquid the weak base reacts with the strong acid to produce a weaker acid, and less of an increase in acidity of the liquid results than would be produced by the addition of the same amount of strong acid to an unbuffered liquid. Similarly, when a strong base is added to a buffered liquid the weak acid of the buffer reacts with the strong base to produce a weaker base and less of a change in alkalinity of the liquid results than would be produced by the addition of the same amount of strong base to an unbuffered liquid. The capacity of a buffered liquid to resist changes in acidity or alkalinity depends on the absolute amount of the appropriate buffer ingredient, i.e. weak acid or weak base, present in the liquid. Only minimum amounts of buffer are used since large concentrations are undesirable. Consequently the buffer capacity must be carefully monitored to make certain the buffer ingredients are not exhausted thereby allowing the acidity or alkalinity of the liquid to deviate from the critical range. This requires the ability to accurately measure the presence of small amounts of weak acid or weak base in the liquid.

Accordingly, it is an object of the present invention to provide an improved method for quantitatively determining the presence of a weak acid or a weak base in a liquid.

It is another object of the invention to provide a method of measuring the buffer capacity of a liquid which accurately measures minute quantities of ionized and un-ionized buffer ingredients.

It is a further object of the invention to provide a method of measuring the presence of a weak acid or weak base in a liquid which is reliable and sensitive and which may be performed using relatively simple and inexpensive apparatus.

It is an additional object of this invention to provide a method for quantitatively determining the presence of a weak acid or base in a liquid which can be practiced effectively on small samples of the liquid.

These and other objects of the invention are achieved by providing a method of measuring the presence of a weak acid or weak base in a liquid comprising the steps of: withdrawing a sample of the liquid; mixing the sample with a known amount of a reagent selected from the group consisting of strong acids and strong bases in excess of the amount necessary to completely react with all of the weak acid or weak base therein; measuring the conductivity of the sample and reagent, and comparing the measured conductivity to a standard value. The invention also embraces the provision of suitable apparatus for practicing the inventive method.

Previous methods for determining the composition of liquids have measured the conductivity of the ionic components of the liquids directly. As mentioned herein above, buffers generally include a substantial portion of un-ionized weak acid or base which cannot be detected by conventional conductivity measurements. Further, the ionized weak acid or base constituents of buffers are often large and complex ions which have low mobility in solution or which may form complexes with other ions and consequently have a correspondingly low conductivity. For these reasons, direct conductivity measurements of liquids are inadequate for measurement of buffer capacities.

The invention obviates the above-mentioned problems by completely reacting the weak acid or base with a reagent selected from the group consisting of relatively strong acids and strong bases. Preferably the acid reagents used in the method of the invention are those which are essentially 100% dissociated in solution such as sulfuric acid, hydrochloric acid and nitric acid, but other relatively strong acids such as phosphoric acid, sulfurous acid, dichloroacetic acid, maleic acid, picric acid, napthalenesulfonic acid, oxalic acid, and trichloroacetic acid may also be utilized. The same is true of the base reagents used in the method of the invention. Alkali metal hydroxides are preferred, but other relatively strong bases such as acetamide, pyrazine, and urea may be used. Generally, an acid or base having a dissociation constant greater than about $10^{-2}$ under the prevailing conditions may be suitably utilized in the inventive method. The term "relatively strong acid or base reagent" as used herein is intended to refer to all such acids and bases. The strong acid or base reagent is added in excess of the amount necessary to completely react with all of the weak acid or base in the liquid, and the conductivity of the resulting solution is measured. An acid reagent is added to the liquid when it is desired to measure the presence of weak base, e.g. the capacity of a buffer to resist acid, and a base reagent is added to the liquid when it is desired to determine the quantity of weak acid present, e.g. the capacity of the buffer to resist basic influences.

The method of the invention includes the step of comparing the measured conductivity of a solution containing a weak acid or weak base after the addition of a known amount of a relatively strong acid or strong base with a standard value. The standard value may usually be conveniently obtained by measuring the conductivity of a similar solution containing no weak acid or base also treated with the same known amount of strong acid or base reagent. Alternately, the standard may be calculated according to theoretical principles from the characteristics of the conductivity cell and the concentration, charge and mobility factor of the ions in solution. The difference in the conductivity, i.e. conductivity differential, is a direct function of the amount of weak acid or base present in the sample and provides a method of increased sensitivity for this determination. Since some of the hydrogen ions or hydroxide ions added with the aforementioned reagents to the solution containing weak acid or base will be consumed by neutralization reaction with the weak acid or base, the remaining concentration and consequently, the conductivity of the solution after addition of the strong acid or base reagent will be less than the conductivity of the solution also treated with reagent but with no weak acid or base present. While direct conductivity measurements are incapable of accurately detecting un-ionized components in a solution, this method accurately indicates the quantitative presence of all such components which react with a strong acid or strong base.

The electrical conductivity of a liquid is dependent not only on the concentration of the ions in solution but also on the mobility of the ions and increases with increasing ion mobility. Since hydrogen ions and hydroxide ions have the highest mobilities of any ionic substances in an aqueous solution, they also have the highest conductivities of any ion at a given concentration. For example, 0.01 molar solution of hydrochloric acid will have a greater conductivity than a 0.01 molar solution of sodium chloride because hydrogen ions have a higher conductivity than sodium ions. Accordingly, when all other factors are equal, such as applied voltage and distance between electrodes, a lower concentration of hydrogen ions will conduct the same current as a significantly higher concentration of sodium ions. Thus, for a given apparatus having a fixed maximum sensitivity to current, much smaller differences in the concentration of hydrogen ions may be detected than of any other cation, and much smaller differences in the concentration of hydroxide ions may be detected than of any other anion. Application of this principle in the method of the invention results in the ability to measure the presence of a weak acid or base with extreme sensitivity.

The mobility of ions in solution, and consequently their conductivity, varies with changes in temperature. Generally, an increase in temperature will increase the mobility of the ions, and thus the conductivity of a given liquid will increase as its temperature is raised. Accordingly, the temperature of a liquid sample often is controlled when making conductivity measurements to determine the concentration of various components in the liquid. In the preferred embodiments of the method of the invention, the temperature of a liquid sample being tested is maintained at its boiling temperature. This is a convenient way of controlling temperature although other ways also may be used.

The conductivity may be recorded on any suitable recording means, such as a conventional strip chart recorder, and subsequently analyzed by comparison with a table of conductivity differences versus known weak acid or base concentrations. Alternately, in a buffered liquid the conductivity difference may be utilized directly to control the addition of additional buffer to the liquid. Under many circumstances, accuracy of the measurements is enhanced by degassing the solution, for example to remove dissolved $CO_2$. This may be effected by boiling or by sparging the solution or by other methods.

The method of the invention is not limited to use in aqueous systems; it is effective in an analogous manner in other solvents in which electrical conductivity is a measurable property such as liquid ammonia.

Also, the method is suitable for testing individual batches of liquids, or for continuously monitoring flowing liquids. In batch operations, the steps of the invention are carried out sequentially. In continuous operations, a liquid sample is continuously or periodically injected into a test stream either before or after addition of the reagent and the conductivity is continuously monitored downstream from the points where the sample and reagent are added.

Furthermore, the inventive method is capable of measuring the presence of a weak acid or base even though other ions are present in the sample so long as the presence of other ions is taken into account in determining the standard value.

The method of the invention will be more completely explained hereinafter by reference to an illustrative experiment and by the description of arrangements for measuring the buffer capacity of boiler water used to generate steam for a steam turbine power plant and for monitoring the borate content in a nuclear reactor in which boron is employed as a chemical shim or neutron absorber. It is understood, however, that the invention is applicable to any situation where the presence of a weak acid or base in a liquid is to be measured.

BRIEF DESCRIPTION OF THE DRAWINGS

The invention will be described in detail with reference to the following drawings wherein:

FIG. 3 is a schematic representation of an arrangement suitable for monitoring the buffer capacity of boiler water condensate utilizing the method of the invention;

FIG. 4 is a schematic representation of an arrangement utilizing the method of the present invention suitable for measuring the boric acid concentration in a solution used as a neutron absorber in a nuclear reactor.

DETAILED DESCRIPTION OF THE PREFERRED EMBODIMENTS

Figure 1:
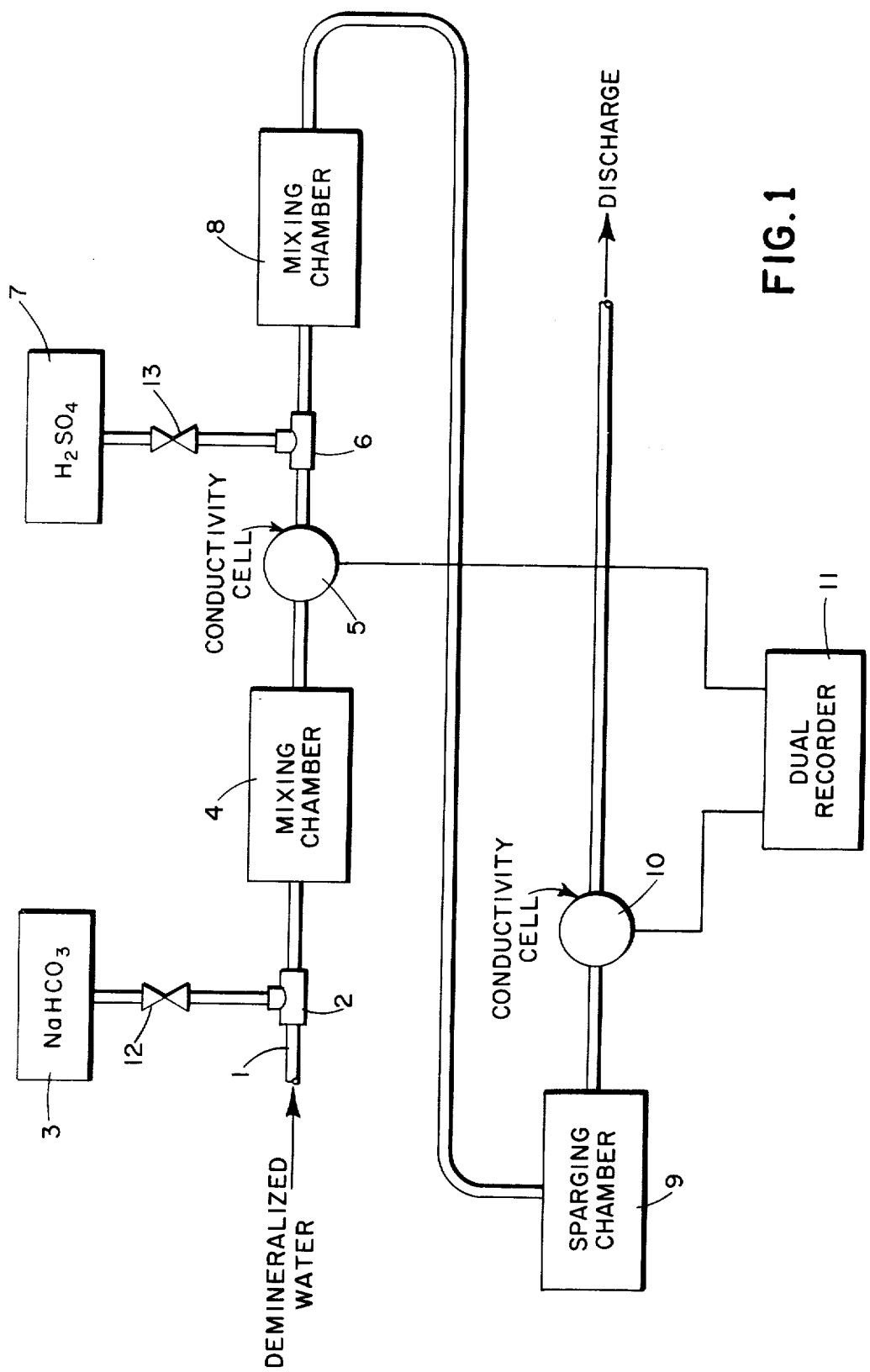
FIG. 1 is a schematic representation of a test apparatus used in an illustrative test to demonstrate the reliability and sensitivity of the method of the invention.
Figure 2:
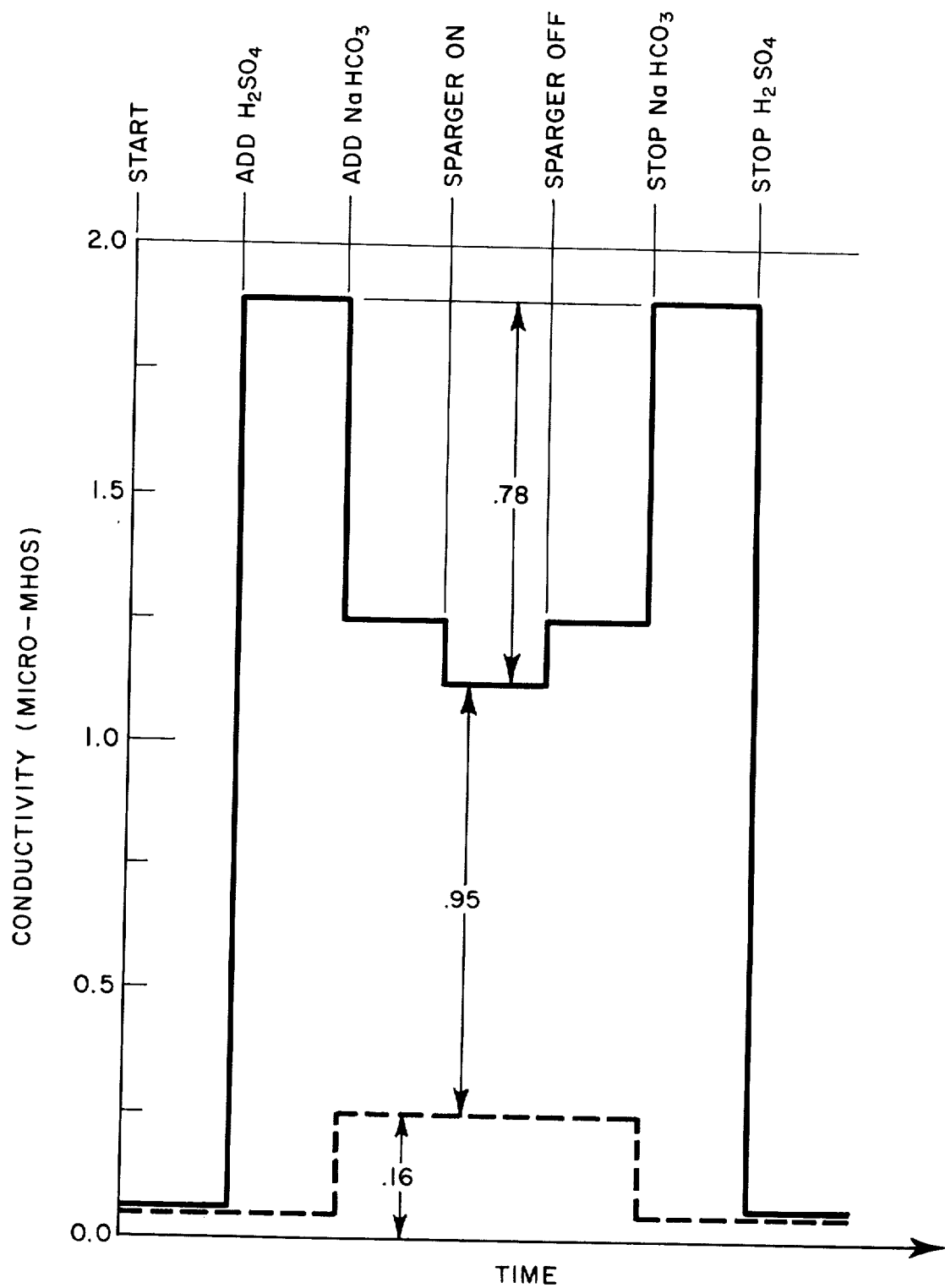
FIG. 2 is a graph showing the results of the illustrative test conducted with the apparatus of FIG. 1.

FIG. 1 is a schematic representation of an experimental arrangement used to illustrate the effectiveness of the present invention. In the experiment sodium bicarbonate served as a weak base and sulfuric acid was used as the reagent. Initially a flow of deionized water was established through conduit 1. The total flow rate was maintained at approximately 310–315 ml. per min. and the temperature of the water was maintained at 20°C. The residual conductivity of the water was measured by conductivity cells 5 and 10 for comparative purposes and was found to be 0.06 micromhos. Throughout the experiment, the conductivity measurements from both cells were recorded on a conventional dual recorder 11 and are shown graphically in FIG. 2 wherein the dotted line represents the conductivity measurement from cell 5 and the solid line represents the measurement from cell 10. The results are also summarized in Table I below:

Table I

|  | Cell 5 Measurement | Cell 10 Measurement |
|---|---|---|
| Start | 0.06 μ mhos | 0.06 μ mhos |
| Add $H_2SO_4$ | 0.06 μ mhos | 1.89 μ mhos |
| Add $NaHCO_3$ | 0.22 μ mhos | 1.24 μ mhos |
| Sparger On | 0.22 μ mhos | 1.11 μ mhos |
| Sparger Off | 0.22 μ mhos | 1.24 μ mhos |
| Stop $N_aHCO_3$ | 0.06 μ mhos | 1.89 μ mhos |
| Stop $H_2SO_4$ | 0.06 μ mhos | 0.06 μ mhos |

After the residual conductivity was measured, valve 13 was opened to admit a 0.0002 N solution of sulfuric acid from tank 7 through T-connector 6 into the water flowing through line 1 at a controlled dilution rate of approximately 1:50. The resulting solution then passed through chamber 8 to ensure uniform mixing. When the addition of acid was begun, the conductivity measurement from cell 10 changed abruptly to 1.89 micromhos while the conductivity measurement from cell 5 remained at 0.06 micromhos. This provided a measure of the conductivity resulting from the addition of the reagent to an unbuffered solution to serve as the standard value. A controlled amount of sodium bicarbonate solution was then introduced into the water from tank 3 through T-connector 2 by opening valve 12 so that the resulting concentration of sodium bicarbonate was about 0.13 parts per million. The sodium bicarbonate solution then passed through mixing chamber 4. The change in conductivity measured by cells 5 and 10 each provide a measure of the amount of sodium bicarbonate added. After the addition of sodium bicarbonate was commenced, the conductivity measurement from cell 5 increased from 0.06 micromhos to 0.22 micromhos, a change of 0.16 micromhos. The conductivity measurement from cell 10 dropped from 1.89 micromhos to 1.24 micromhos. A further slight decrease in the conductivity measurement from cell 10 from 1.24 micromhos to 1.11 micromhos was effected by bubbling $CO_2$-free gas through the solution in sparging chamber 9 to remove dissolved carbon dioxide produced by the neutralization of the bicarbonate ions. This gave a total conductivity change of 0.78 micromhos when the method of the invention was used to measure the sodium bicarbonate content of the solution as compared to a change of only 0.16 micromhos when the conductivity of the sodium bicarbonate was measured directly. Significantly, the change in conductivity caused by the sodium bicarbonate when the acid reagent was present was almost five times as great as when no acid was added. This clearly demonstrates the increased sensitivity achieved by the invention.

FIG. 3 is a schematic representation of an apparatus for quantitatively measuring the presence of the basic buffer ingredient in a slightly buffered alkaline water source such as a boiler condensate return line. A sample of the condensate is withdrawn from return line 21 through valve 22 and passed to a constant head device designated by the numeral 23. The constant head device comprises an inner chamber 24 connected to outlet line 25 and an annular outer chamber 26 connected to waste line 27. The sample feed rate to chamber 24 is slightly greater than the outflow rate through line 25 so that a small portion of the sample overflows chamber 24 to waste thereby maintaining a constant head on the main portion of the sample which flows out through line 25 to heat exchanger 28 where it is preheated by effluent from the conductivity cell. The sample then flows to mixing tee 29 where it is mixed with a controlled proportion of a strong acid reagent brought in through line 30 from constant reagent head device 31. The proportion of reagent supplied must be in excess of the amount required react with all of the buffer ingredient in the sample. After mixing with the acid, the sample solution passes through flowmeter 32 and valve 33 to a stainless steel chamber 34. The flowmeter and its associated valve are used to maintain a constant flowrate of treated sample into the chamber. An electrical immersion stainless steel heater 35 in chamber 34 is used to heat the reagent-treated sample to boiling. Boiling is a convenient manner of degassing the solution and of maintaining a constant temperature. A conventional reboil regulator 36 associated with heater 35 adjusts the heating of the sample to maintain a plume of steam from vent 37 in chamber 34. The heated sample leaves chamber 34 through line 38, which is preferably vented as at 39 to prevent syphoning of the sample from chamber 34 thereby maintaining the level in the chamber, and passes to conductivity cell 40 where the conductivity of the treated sample is measured. The conductivity measurement is sensed by comparator device 41 which compares the measured value to a standard calibrated in a manner described hereinafter. The difference between the measured and standard values is recorded on a strip chart recorder 42. After the conductivity is measured, the sample flows through line 43 to heat exchanger 28 where some of its heat is transferred to the incoming sample stream before being discharged to waste at 44.

The standard used in the comparator device 41 is calibrated by closing valve 22 to shut off the flow of sample to the system and opening valve 45 which communicates with a supply of deionized water 46. The deionized water then flows through the system under the same conditions of flow, temperature, pressure and reagent application as did the condenser water. The conductivity of the deionized water plus added reagent is measured as before by conductivity cell 40 and the result of the measurement is again passed to the comparator. Since the conductivity of the deionized water plus the reagent should approach theoretical values, the standard in the comparator is adjusted by means of a variable resistor until the measured value and the standard are balanced, and zero buffer is indicated on the recorder. After the calibration is completed, valve 45 is closed and valve 22 is reopened to resume monitoring of the buffer capacity of the boiler condensate sample stream. The difference between the conductivity of the reagent-treated boiler condensate sample and the standard, i.e. the conductivity of the reagent-treated deionized water, indicates the quantity of buffer in the boiler condensate.

Alternatively, a standard buffer solution may be used in place of the deionized water in the calibration operation. The difference in conductivities then indicates the deviation of the boiler condensate buffer content from the standard instead of the absolute amount of the buffer in the condensate. If desired in situations where buffer is continuously added to the boiler feed water supply, the signal from comparator device 41 may be used to control the addition of buffer from a buffer supply 47 to the stream flowing through line 21 by means of a solenoid valve 48 interposed in connecting line 49.

FIG. 3 also shows an optional arrangement useful for confirmatory purposes. A second controlled amount of reagent is added to the stream flowing through line 43 from acid reagent constant head device 31' through line 30' and mixing tee 29'. The conductivity of the sample stream is again measured by conductivity cell 40' and the result passed to comparator 41 for comparison with a second standard value. It is expressly contemplated that the second standard value could be equal to the first standard value. Possibly, there could be a series of three, four or even more sequential additions of reagent each followed by a subsequent measurement of the conductivity. Different reagents could be added at any of the successive points.

A further apparatus utilizing the method of the invention is illustrated schematically in FIG. 4. This arrangement is adapted for situations where for economic or other reasons only very small amounts of sample are used. This arrangement also conserves the amount of reagent required in the measurement operation if the concentration of weak acid or base in the sample being measured is quite high. For example, this arrangement is useful in measuring boric acid used in nuclear power plants in concentrations up to 2500 ppm. Numeral 50 designates a conduit in which a flow of highly pure strong base reagent is established. The basic reagent may be provided by diluting a standard reagent solution with deionized or distilled water in mixing tee 51. The reagent supply 52 and the high purity water supply 53 may be provided with constant head devices 54 and 55 respectively to ensure uniform dilution of the reagent. Alternatively a small volume pump may be used to feed the reagent into the high purity water line at a controlled rate. A mixing chamber 56 may also be inserted into the line to ensure uniform mixing. The reagent flow is split into two streams at 57 which flow through lines 58 and 59. An injection device 60 withdraws a small sample of borate solution from the reactor through line 61 and injects it into line 59. The volume of the injected sample must be negligible compared to the volume of reagent flowing through line 59 to avoid distortion of the results due to dilution. Alternately, an amount of deionized water equal to the volume of the sample could be added to the stream flowing through line 58 to equalize the dilution. It is of course essential that the strong base flowing through line 59 be in excess of the amount required to completely react with all of the boric acid in the sample injected into the line. The two streams then flow to conductivity cells 62 and 63 where the conductivity of each is measured. The results of the two measurements are sensed by comparator device 64 which compares them and provides a signal to recorder 65 to indicate the difference in conductivity. The two streams are then discharged as at 73.

A mixing chamber 66 may be provided on line 59 to facilitate complete mixing of the sample and reagent. To ensure the two conductivity measurements are strictly comparable, it is desirable to equalize the flows through lines 58 and 59. For this purpose flowmeters 67 and 68 and control valves 69 and 70 are inserted in lines 58 and 59 respectively and a chamber 71 identical to mixing chamber 66 is inserted in line 58.

To further conserve on the amount of sample and reagent utilized, the operation of injection device 60 may be controlled by a timer 72 to provide for intermittent injection of a controlled volume of sample into line 59. The concentration of reagent may be reduced so long as chamber 66 contains a controlled excess of the reagent each time a sample is injected. The boric acid quickly reacts with the basic reagent in chamber 66 producing a temporary decrease in conductivity sensed by conductivity cell 63 which shows up as a peak on recorder 65. In either the direct or intermittent methods of operation, the recorder may be calibrated to provide a direct readout in concentration of boric acid in the sample being measured by injecting standard samples of known concentration through the system.

The foregoing arrangements have been described merely as illustrations of the use of the method of the invention. The invention is not limited to use in steam generator systems or nuclear reactors or even aqueous systems in general, but is applicable for measuring the presence of weak acids or bases in liquid systems of all types. Modifications of the invention undoubtedly will occur to those skilled in the art, therefore, the scope of the invention is to be limited soley by the scope of the appended claims.

We claim:

1. A method of measuring the presence of a weakly acidic or basic chemical in a liquid, wherein a substantial portion of said weakly acidic or basic chemical is present in un-ionized form, said method comprising the steps of:

withdrawing a representative sample of the liquid in which an amount of said chemical is present;

reacting all of said chemical in said sample by mixing said sample with a known amount of a reagent selected from the group consisting of relatively strong acids when said chemical is a weak base and relatively strong bases when said chemical is a weak acid;

said known amount of reagent being in excess of the amount required to completely react with all of said chemical in the sample;

measuring the electrical conductivity of the sample after mixing with the reagent, said conductivity including an appreciable conductivity contribution due to the excess reagent after all of said chemical has been reacted with reagent; and comparing the measured conductivity to a standard value.

2. A method as recited in claim 1 wherein the conductivity measurement is effected at a controlled constant temperature.

3. A method as recited in claim 2 wherein said constant temperature is the boiling temperature of the liquid.

4. A method as recited in claim 1 wherein the liquid sample is subjected to a degassing operation after the addition of the reagent and before the measurement of the conductivity.

5. A method as recited in claim 4 wherein said degassing operation comprises sparging the liquid sample with $CO_2$-free gas.

6. A method as recited in claim 4 wherein said degassing operation comprises boiling the liquid sample.

7. A method as recited in claim 1 further comprising the additional step of determining, prior to the final comparison step, a value for the electrical conductivity of a similar sample of a liquid treated with reagent as in the reacting step to be used as the standard value in the final comparison step.

8. A method as recited in claim 7 wherein said value for the electrical conductivity of said similar sample of liquid is determined by direct measurement of the conductivity.

9. A method as recited in claim 8 wherein said similar sample of liquid is free of the chemical being measured.

10. A method as recited in claim 8 wherein said similar sample of liquid contains a desired concentration of the chemical being measured.

11. A method as recited in claim 1 wherein said liquid is an aqueous liquid.

12. A method as recited in claim 11 wherein said chemical is a weak base and said reagent comprises a relatively strong acid.

13. A method as recited in claim 12 wherein said acid reagent comprises an acid which is essentially 100% dissociated in aqueous solution selected from the group consisting of sulfuric acid, hydrochloric acid, and nitric acid.

14. A method as recited in claim 12 wherein said acid reagent is selected from the group consisting of phosphoric acid, dichloracetic acid, trichloroacetic acid, picric acid, maleic acid, oxalic acid, sulfurous acid, and napthalenesulfonic acid.

15. A method as recited in claim 11 wherein said chemical is a weak acid and said reagent comprises a relatively strong base.

16. A method as recited in claim 15 wherein said relatively strong base comprises an alkali metal hydroxide.

17. A method as recited in claim 15 wherein said relatively strong base is selected from the group consisting of acetamide, pyrazine, and urea.

18. A method of determining the capacity of a buffered liquid to resist the influence of an agent selected from the class consisting of acids and bases comprising the steps of:
   withdrawing a sample of the buffered liquid;
   mixing said sample with a known amount of a reagent selected from the group consisting of relatively strong acids when said agent is an acid and relatively strong bases when said agent is a base;
   said known amount of reagent being in excess of the amount required to exhaust the buffer in the liquid sample;
   measuring the electrical conductivity of the sample after mixing with the reagent, said conductivity including an appreciable conductivity contribution due to the excess reagent after all of said buffer has been reacted with reagent, and
   comparing the measured conductivity to a standard value.

19. A method of continuously measuring the presence of a weakly acidic or basic chemical in a liquid wherein a substantial portion of said weakly acidic or basic chemical is present in un-ionized form, said method comprising the steps of:
   continuously withdrawing a portion of said liquid as a continuously flowing representative sample in which an amount of said chemical is present;
   reacting all of said chemical in said sample by adding a known proportion of reagent selected from the group consisting of relatively strong acids when said chemical is a weak base and relatively strong bases when said chemical is a weak acid to the sample at a first point along the flow path of the sample; said known proportion of reagent being in excess of the amount required to completely react with all of said chemical in the sample;
   measuring the electrical conductivity of the sample at a second point along said flow path downstream from said first point; said conductivity including an appreciable conductivity contribution due to the excess reagent after all of said chemical has been reacted with reagent; and
   comparing the measured conductivity to a standard value.

20. A method as recited in claim 19 further comprising the steps of:
   adding a second known proportion of said reagent to the sample at a third point along said flow path downstream from said second point;
   measuring the electrical conductivity of the sample at a fourth point along said flow path downstream from said third point, and
   comparing the conductivity measured at said fourth point to a second standard value.

21. A method as recited in claim 20 wherein the two standard values are equal.

22. A method of measuring the presence of a weakly acidic or basic chemical in a liquid wherein a substantial portion of said weakly acidic or basic chemical is present in un-ionized form, said method comprising the steps of:
   preparing a solution of known concentration of reagent selected from the class consisting of relatively strong acids when said chemical is a weak base and relatively strong bases when said chemical is a weak acid;
   dividing said reagent solution into first and second portions;
   withdrawing a representative sample of the liquid in which an amount of said weakly acidic or basic chemical is present;
   injecting a known proportion of sample into the first reagent solution portion;
   said known proportion of sample being insufficient to completely react with all of the reagent in said first reagent solution portion whereby all of said chemical in said known proportion of sample is reacted and excess reagent remains therein;
   measuring the electrical conductivity of each of said first and second reagent solution portions, said conductivity of said first reagent solution portion including an appreciable conductivity contribution due to the excess reagent, and
   comparing the conductivity measurements of said first and second reagent solution portions.

23. A method as recited in claim 22 wherein a proportion of pure liquid equal to the proportion of sample injected into said first reagent solution portion is injected into said second reagent solution portion to equalize dilution.

24. A method as recited in claim 22 wherein said first and second reagent solution portions are equal.

25. Apparatus for measuring the presence of a weakly acidic or basic chemical in a liquid wherein a substantial portion of said weakly acidic or basic chemical is present in un-ionized form, said apparatus comprising:
   a pair of conduits adapted to provide two separate flow paths for a liquid stream;

a common source of acid or base reagent connected to each of said conduits for establishing a flow reagent therethrough;

a conductivity cell on each of said conduits downstream from said reagent source adapted to measure the electrical conductivity of a liquid flowing therethrough;

a comparator device electrically connected to each of said conductivity cells adapted to compare the conductivity values measured by the two conductivity cells; and injection means on one of said conduits between said reagent source and the conductivity cell for injecting a controlled proportion of liquid sample in which the presence of a weakly acidic or basic chemical is to be measured into a stream of liquid flowing through said one conduit.

26. An apparatus as recited in claim 25 further comprising injection means on the other of said conduits between said reagent source and the conductivity cell for injecting a controlled proportion of pure liquid into a stream of liquid flowing through said other conduit.

27. Apparatus for measuring the presence of a weakly acidic or basic chemical in a liquid wherein a substantial portion of said weakly acidic or basic chemical is present in un-ionized form; said apparatus comprising:

conduit means to establish a flow path for a sample of a liquid in which the presence of a weakly acidic or basic chemical is to be measured;

pressure regulating means for controlling the fluid pressure of a liquid sample flowing through said conduit means;

reagent supply means communicating with said conduit means downstream from said pressure regulating means for supplying a controlled amount of relatively strong acid or base reagent to a liquid sample flowing through said conduit means;

flow rate measuring means and flow rate control means on said conduit means for regulating the rate of flow of a liquid sample flowing through said conduit means;

sparging means on said conduit downstream from said reagent supply means adapted to remove dissolved gases from a liquid sample flowing through said conduit means;

a conductivity cell on said conduit means downstream from said sparging means adapted to measure the electrical conductivity of a liquid sample flowing through said conduit means; and a comparator device electrically connected to said conductivity cell adapted to compare the conductivity value of a liquid sample measured by said conductivity cell to a standard value.

28. An apparatus as recited in claim 27 further comprising temperature regulating means on said conduit means upstream from said conductivity cell for controlling the temperature of a liquid sample flowing through said conductivity cell.

29. An apparatus for measuring the presence of a weakly acidic or basic chemical in a liquid wherein a substantial portion of said weakly acidic or basic chemical is present in un-ionized form, said apparatus comprising:

conduit means to establish a flow path for a sample of a liquid in which the presence of a weakly acidic or basic chemical is to be measured;

a first reagent supply means communicating with said conduit means for supplying a controlled amount of acid or base reagent to a liquid sample flowing through said conduit means;

a conductivity cell on said conduit means downstream from said first reagent supply means adapted to measure the electrical conductivity of a liquid sample flowing through said conduit means;

a comparator device electrically connected to said conductivity cell adapted to compare the conductivity value of a liquid sample measured by said conductivity cell to a first standard value;

a second reagent supply means communicating with said conduit means downstream from said first conductivity cell for supplying a controlled amount of acid or base reagent to a liquid sample flowing through said conduit means; and a second conductivity cell on said conduit means downstream from said second reagent supply means adapted to measure the electrical conductivity of a liquid sample flowing through said conduit means; said second conductivity cell being electrically connected to said comparator device to facilitate comparison of the conductivity value measured by said second conductivity cell to a second standard value.

30. Apparatus for continuously measuring the presence of a weakly acidic or basic chemical in a liquid wherein a substantial portion of said weakly acidic or basic chemical is present in un-ionized form; said apparatus comprising:

conduit means to establish a flow path for a sample of a liquid in which the presence of a weakly acidic or basic chemical is to be measured;

pressure regulating means for controlling the fluid pressure of a liquid sample flowing through said conduit means;

flow rate measuring means and flow rate control means on said conduit means for regulating the flow of a liquid sample flowing through said conduit means;

a first reagent supply means communicating with said conduit means downstream from said pressure regulating means for supplying a controlled amount of relatively strong acid or base reagent to a liquid sample flowing through said conduit means;

a first conductivity cell on said conduit means downstream from said first reagent supply means adapted to measure the electrical conductivity of a liquid sample flowing through said conduit means;

a second reagent supply means communicating with said conduit means downstream from said first conductivity cell for supplying a controlled amount of acid or base reagent to a liquid sample flowing through said conduit means;

a second conductivity cell on said conduit means downstream from said second reagent supply means adapted to measure the electrical conductivity of a liquid sample flowing through said conduit means;

means on said conduit means for controlling the amount of dissolved carbon dioxide in a liquid sample flowing through said conduit means; and a comparator device electrically connected to said first and second conductivity cells adapted to compare the conductivity values measured by said first and second conductivity cells to a standard value.

* * * * *